United States Patent [19]

Ahn

[11] Patent Number: 5,502,705
[45] Date of Patent: Mar. 26, 1996

[54] CARTRIDGE-HOLDER LOCKING DEVICE FOR A MAGNETOOPTICAL DISK PLAYER

[75] Inventor: Seoung-joon Ahn, Seoul, Rep. of Korea

[73] Assignee: Samsung Electronics Co., Ltd., Kyungki-Do, Rep. of Korea

[21] Appl. No.: 250,672

[22] Filed: May 27, 1994

[30] Foreign Application Priority Data

Jun. 1, 1993 [KR] Rep. of Korea .......... 93-9801

[51] Int. Cl.$^6$ .................................................. G11B 33/02
[52] U.S. Cl. ......................................................... 369/77.2
[58] Field of Search .............................. 369/77.2, 77.1, 369/75.2, 75.1, 13; 360/99.06, 99.02, 96.05, 96.06, 97

[56] References Cited

U.S. PATENT DOCUMENTS

| | | | |
|---|---|---|---|
| 4,433,406 | 2/1984 | Saito et al. | 369/77.2 |
| 4,439,850 | 3/1984 | Takahara et al. | 369/75.2 |
| 5,124,854 | 6/1992 | Iyota et al. | 360/96.6 |
| 5,359,478 | 10/1994 | Kawano | 369/77.2 |

*Primary Examiner*—Stuart S. Levy
*Assistant Examiner*—Allen Cao
*Attorney, Agent, or Firm*—Sughrue, Mion, Zinn, Macpeak & Seas

[57] ABSTRACT

A cartridge-holder locking device for a magnetooptical disk player includes a biasing device for elastically biasing a cartridge holder in the open, cartridge insertion/withdrawal position, a locking pin fixed to the cartridge holder, and a locking/releasing device installed at a position of the deck corresponding to the locking pin for locking and releasing the locking pin. The locking device includes a slide plate with locking piece, a solenoid, and a spring. The spring biases the slide plate and locking piece to engage the locking pin and hold the cartridge holder in the loaded, ready to play, position. Upon actuation, the solenoid overcomes the bias of the spring to move the slide plate and locking piece away from the locked position to permit the cartridge holder to move to the open position.

2 Claims, 2 Drawing Sheets

CARTRIDGE-HOLDER LOCKING DEVICE FOR A MAGNETOOPTICAL DISK PLAYER

BACKGROUND OF THE INVENTION

The present invention relates to a cartridge-holder locking device for a magnetooptical disk player and, more particularly, to a locking device which locks/unlocks a cartridge holder, one side of which is rotatably installed on the deck of a magnetooptical disk player.

The development of 64 mm diameter magnetooptical disk cartridges (commercially referred to as "minidisks") has been under way since the minidisk was first introduced (by Sony of Japan). A portable minidisk player (Sony model MZ-1) for recording and playback operations is currently on the market. The player has a slot into which a minidisk is inserted. A minidisk cartridge is loaded onto the deck of the player by the driving force of a motor, with the shutter of the cartridge being moved aside to open a communicating aperture, and is mounted on a turntable rotated by a spindle motor.

In general, it is desirable that a portable player be as light and as small as possible, allow the rapid insertion/extraction of a disk cartridge, and have a very low rate of power consumption. However, due to the specific construction of the insertion means, i.e., via a slot, the Sony minidisk player has a complicated structure for insertion/extraction of the cartridge. Further, due to the use of a motor, it is difficult to miniaturize and reduce the weight of the player and to speed up the inserting and extracting operations. That is, the motorized apparatus, which is used to insert and/or draw out the minidisk, increases the player's overall power consumption. Accordingly, battery power is not efficiently utilized.

SUMMARY OF THE INVENTION

Therefore, to overcome such problems, it is an object of the present invention to provide a cartridge-holder locking device for a magnetooptical disk player in which the number of components for use in opening and loading the cartridge holder is reduced, so as to miniaturize and lighten the player, increase the opening and loading speeds, and reduce power consumption.

To accomplish the latter object, there is provided a cartridge-holder device for a magnetooptical disk player comprising:

a cartridge holder rotatably mounted on the rear of a deck of the player to open and receive a disk cartridge;

means for elastically biasing the cartridge holder upward, centering on the rear of the deck;

a locking pin fixed to one side of the cartridge holder; and locking/releasing means installed at a position of the deck corresponding to the locking pin for locking or releasing the locking pin.

BRIEF DESCRIPTION OF THE DRAWINGS

The above object and advantages of the present invention will become more apparent from the following description of a preferred embodiment thereof, with reference to the attached drawings in which.

DETAILED DESCRIPTION OF THE INVENTION

Figure 1:
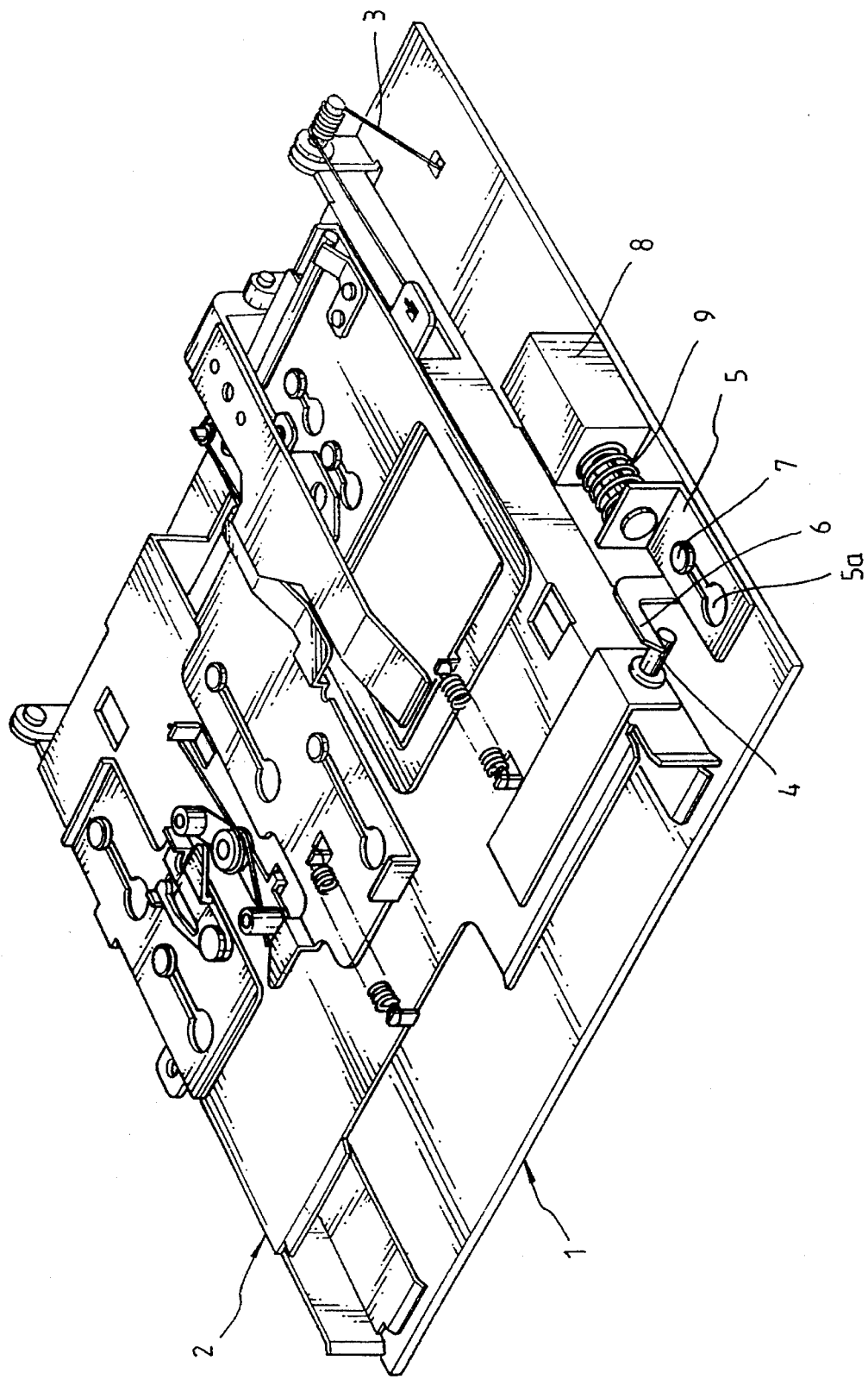
FIG. 1 is a perspective view of a magnetooptical disk player to which a cartridge-holder locking device of the present invention is applied.
Figure 2:
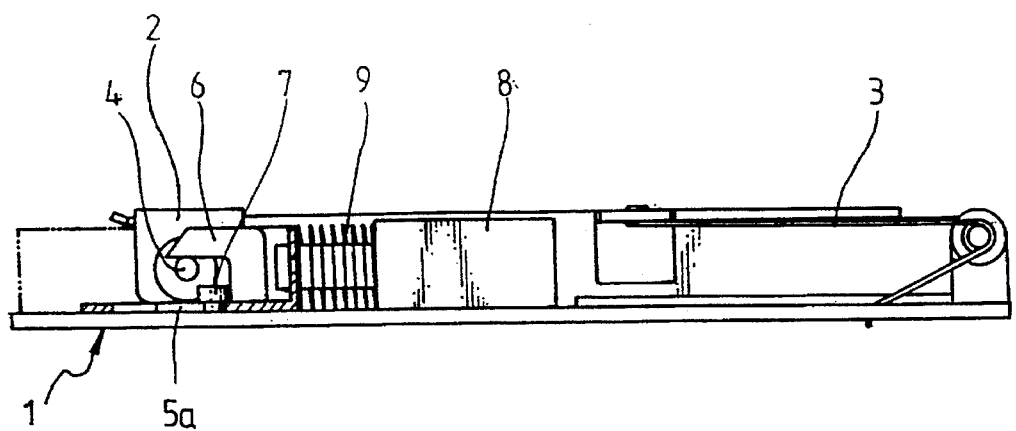
FIG. 2 is a side view of a cartridge-holder locking device of the present invention in a state before the cartridge holder is opened.
Figure 3:
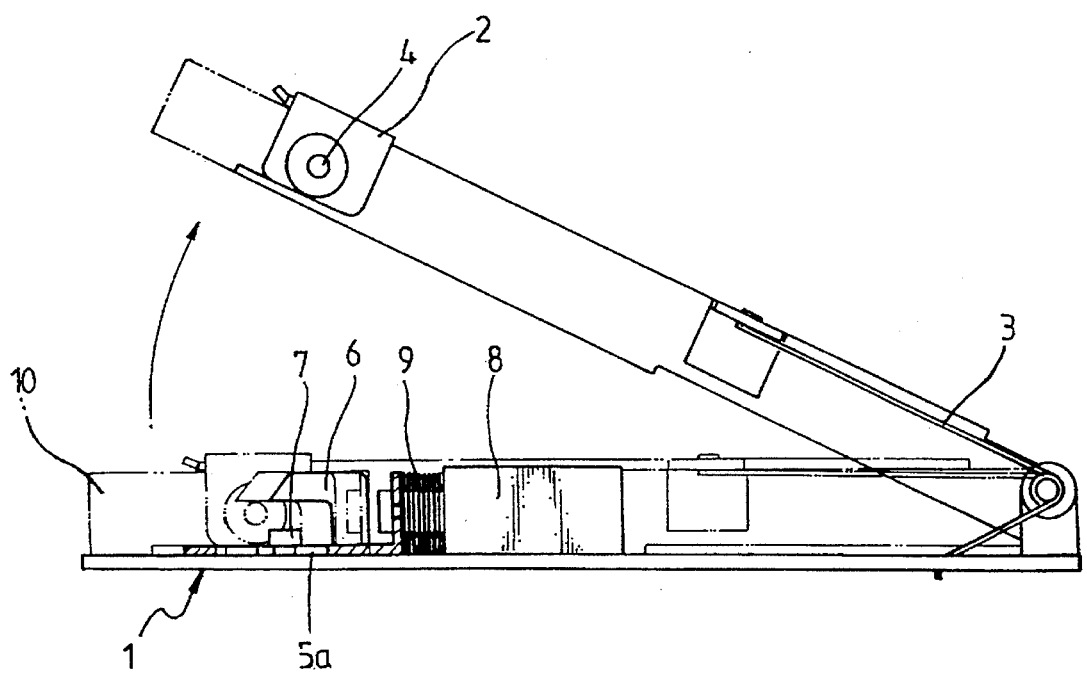
FIG. 3 is a side view of a cartridge-holder locking device of the present invention in a state after the cartridge holder is opened.

Referring to FIGS. 1–3, the rear of a cartridge holder 2, into which a disk cartridge is inserted, is rotatably mounted on the corresponding side of player deck 1. Cartridge holder 2 is installed to be elastically biased upward toward the open, cartridge insertion/withdrawal position by a torsion spring 3. Alternatively, any other suitable means for biasing the cartridge holder in the open direction may be used instead of the torsion spring.

A locking pin 4 is provided on one side of cartridge holder 2. A slide plate 5 having a locking piece 6 for holding locking pin 4 is provided at a position of deck 1 corresponding to that of locking pin 4. Slide plate 5 has an elongated guide hole 5a for allowing the slide plate 5 to slide along a guide pin 7 mounted on the deck 1.

A solenoid 8, fixedly installed on upward portion of slide plate 5, pulls the slide plate to thereby release pin 4 from locking piece 6, thereby unlocking the cartridge holder 2. A spring 9 for returning slide plate 5 to the initial position (the locking position) is installed between solenoid 8 and slide plate 5.

The cartridge-holder locking device for the magnetooptical disk player operates in the following manner. First, referring to FIG. 2, which shows the cartridge holder in the locked state, the locking pin 4 is locked by locking piece 6 of slide plate 5. The solenoid 8 is operated by applying power thereto, to pull slide plate 5 in a direction to unlock the cartridge holder 2.

As slide plate 5 compresses spring 9 and moves linearly along pin 7, which guides the movement along guide opening 5a, the locking piece 6 moves away from pin 4, thereby unlocking the cartridge holder 2. The elastic force of torsion spring 3 causes the cartridge holder 2 to rotate upward about its hinge to the position shown in FIG. 3. When the applied power is cut off, the locking piece 6 of slide plate 5 returns to the initial position by the restoring force of compressed spring 9.

When the cartridge holder 2 is open, as shown in FIG. 3, a disk cartridge 10 may be inserted therein or withdrawn therefrom. Thereafter, the cartridge holder 2 is pressed downward, causing the locking pin 4 to push against the sloped end of locking piece 6. This moves the locking piece 6 and slide plate 5 in the direction to compress spring 9 momentarily. As the pin 4 passes the sloped end of locking piece 6, the spring 9 pushes plate 5 and locking piece 6 in the opposite direction to lock the cartridge holder in place, as shown in FIG. 2.

The combination of slide plate 5, locking piece 6, solenoid 8 and spring 9 constitutes a locking/releasing means for locking the cartridge holder in the loaded position and for releasing the cartridge holder to move to the open position. Any other suitable locking/releasing means which is biased in a locking position and which releases the cartridge holder upon actuation may be substituted for the one shown.

Accordingly, the cartridge-holder locking device for a magnetooptical disk player according to the present invention, reduces the number of components, allowing for a miniaturized, lightweight player, and increases the opening and loading speeds, thereby enhancing its commercial value. Further, the present invention lowers power consumption so that the player can be used efficiently under battery power.

What is claimed is:

1. A cartridge-holder device for a magnetooptical disk player comprising:

a cartridge holder rotatably mounted on a rear side of a deck of said player to pivot between an open, cartridge insertion/removal position, and a loaded, disk playing position;

means for elastically biasing said cartridge holder to pivot toward said open position;

a locking pin fixed to one side of said cartridge holder; and locking/releasing means mounted on said deck for engaging said locking pin to lock said cartridge holder in said loaded position against a bias of said biasing means, and for releasing said locking pin to allow said biasing means to move said cartridge holder to said open position, said locking/releasing means comprising:

a slide plate positioned to slide along said deck from a first position to other positions;

a locking piece attached to said slide plate, said locking piece having an edge for locking said locking pin and therefore said cartridge holder, in the loaded position when said slide plate is in said first position;

said locking piece further having a sloped surface at a part thereof which meets said locking pin when said cartridge holder is moved from said open position to said loaded position and said slide plate is in said first position, whereby a forced movement of said cartridge holder towards said loaded position forces movement of said locking piece and said slide plate away from said first position until said locking pin moves past said sloped surface;

a solenoid having a housing and a shaft, said solenoid being positioned on said deck and said shaft being connected to said slide plate; and a spring surrounding said shaft between said slide plate and said housing for biasing said slide plate toward said first position, whereby actuation of said solenoid causes said shaft to move said slide plate away from said first position, and deactivation of said solenoid causes said spring to move said slide plate back to said first position.

2. A cartridge-holder device for a magnetooptical disk player as claimed in claim 1, wherein said locking/releasing means comprises:

a guide pin fixed to said deck;

said slide plate having an elongated guide hole formed therein; said slide plate being positioned on said deck whereby said guide pin passes through said guide hole to allow movement of said slide plate linearly along said deck;

said locking piece formed on said slide plate and engaging said locking pin when said slide plate is in the first position and said cartridge holder is in the loaded position; and an actuator installed on said player deck for moving said slide plate.

* * * * *